Sept. 29, 1959 W. L. CHURCH 2,906,283
CHOKE
Filed June 27, 1955
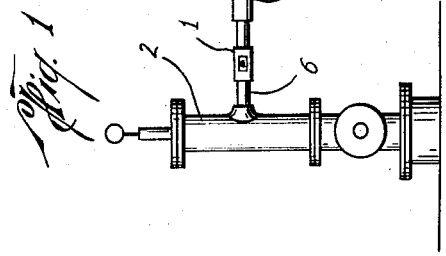
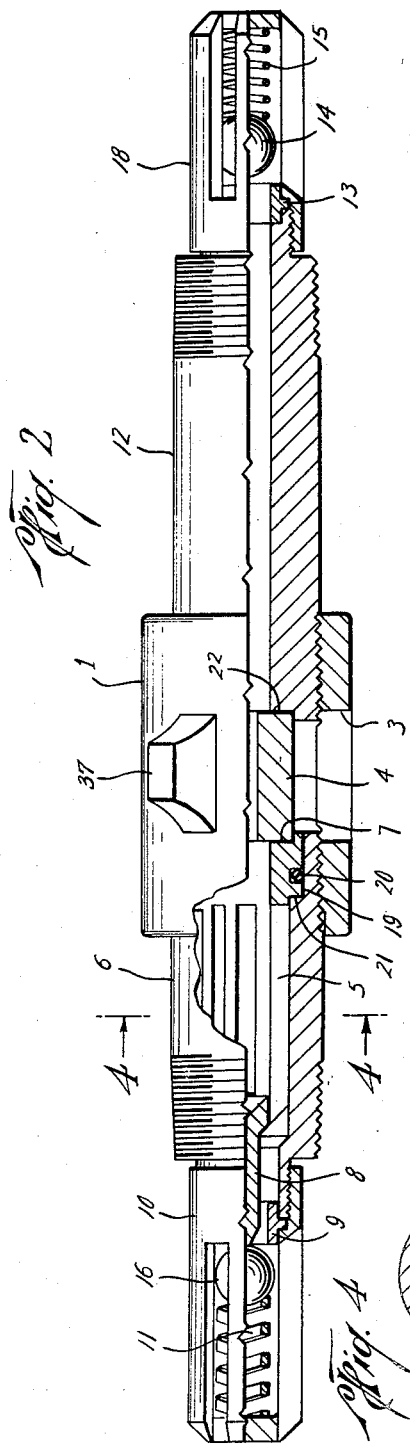
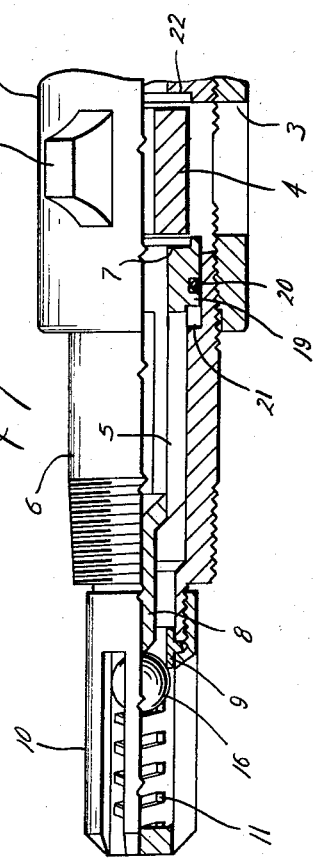
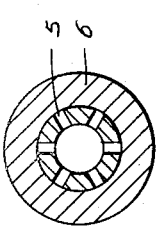
Walter L. Church
INVENTOR.
BY Ranseler O Wyatt
ATTORNEY 2,906,283
CHOKE Walter L. Church, Houston, Tex.

Application June 27, 1955, Serial No. 518,145

4 Claims. (Cl. 137—315)

This invention relates to new and useful improvements in a choke.

It is an object of this invention to provide means for quickly and easily changing the flow bean in a choke used in conduits such as in the outlet lines of a Christmas tree in a well head.

It is another object of the invention to provide novel means for opening and closing the inlet valve of a choke.

With the above and other objects in view, the invention has relation to certain novel features of construction, operation and arrangement of parts more particularly described in the following specification and illustrated in the accompanying drawings, wherein:

Figure 1 is a plan view of the device mounted in a flow line off of a Christmas tree.

Figure 2 is a longitudinal view, partially in section, showing the device in flowing position.

Figure 3 is a fragmentary view, partly in section, showing the device in non-flowing position.

Figure 4 is a cross sectional view, taken on the line 4—4 of Figure 2.

Referring now more particularly to the drawing, the numeral 1 designates a tubular sleeve having each end internally threaded, the threads of the respective ends being spiralled in opposite directions. A slot 3 is provided in the sleeve 1 to permit insertion of the flow bean 4. A tubular member 5, slotted to form a cage, is slidably mounted in a conduit, as 6, the conduit 6 being threaded at one end to be received by one end of the sleeve 1 and at its other end to be received by the outlet of the Christmas tree 2, or the like. One end of the member 5 is externally enlarged forming the shoulder 19 on which a suitable sealing means as the O-ring and groove, as 20, may be provided, and has a recess 7 to receive one end of the flow bean 4 and the other end is tapered inwardly, and has the outwardly extended finger 8. The inlet end of the conduit 6 is reduced and externally threaded and has a valve seat, as 9, mounted in the end face thereof and a ball valve cage, as 10, is mounted on the reduced end of the conduit 6 and will extend into the Christmas tree outlet. A ball 16 is maintained yieldably seated on said seat 9 by a relatively strong coil spring 11, and the opposing end of the conduit 6 being internally enlarged forming a chamber 21 which receives the shoulder 19 of the member 5.

A conduit as 12 is threaded at one end to be received by one end of the sleeve 1 and its end face is recessed as at 22 to receive one end of the flow bean 4, and at its other end is reduced and threaded to be received by one section of a pipe line, as 17, and mounted in the outlet end of said conduit 12 is a valve seat 13. A cage 18 is mounted on said reduced end of the conduit 12 and will be inserted in the pipe 17, and a ball valve, as 14, is maintained in said cage 18 and is yieldably seated on said seat 13 by the coil spring 15.

Suitable lugs, as 37, may be provided on the outer surface of the sleeve 1 to facilitate rotation of the sleeve.

When the device is mounted in a flow line and it is desired to change the flow bean 4, the sleeve 1 is rotated in a reverse direction, moving the conduits 6, 12 away from the flow bean, freeing the flow bean so that it may be removed through the slot 3. The finger 8 of the member 5 bears against the ball valve 16 and when the parts are assembled, maintains said valve off of the seat 9, permitting a flow of fluid through the cage of the member 5. As the conduit 6 is moved away from the flow bean 4, the ball valve 16 will close. This is accomplished by rotation of the sleeve 1 causing the conduit 6 to move outwardly and the valve seat 9 thus moving beyond the end of the finger 8 on the member 5 until said ball valve is seated in the seat 9 and the flow of fluid therethrough will cease. The conduit 12 is simultaneously moved away from the flow bean 4 and the ball valve 14 will seat in the seat 13, as soon as the flow of fluid from the inlet line stops, thus preventing any back flow while the bean 4 is being removed and replaced. When the bean 4 has been replaced, the operation is reversed, the sleeve 1 being rotated in a forward direction, moving the conduits 6, 12 towards the bean 4 and the finger 8 of the member 5 bearing against and moving the ball 10 off of the seat 9, and the pressure of the flow moving the valve 14 off of the seat 13.

While the foregoing is considered a preferred form of the invention, it is by way of illustration only, the broad principle of the invention being defined by the appended claims.

What I claim is:

1. In a choke, a rotatable sleeve, a flow bean mounted in said sleeve, the ends of said sleeve being internally threaded and the threads thereof being spiralled in opposite directions, conduits mounted on the outlet and inlet ends of said sleeve, means for rotating said sleeve and to cause the conduits to move outwardly when the sleeve is rotated in one direction and inwardly when the sleeve is rotated in the opposite direction, the conduit mounted on the inlet side of said sleeve having a cage freely mounted therein, one end of said cage being recessed to receive one end of the flow bean and the other end of said cage having valve actuating means thereon, a yieldable flow valve in said conduit positioned to be opened and closed by said cage through the movement of the conduit upon rotation of said sleeve.

2. In a choke, a rotatable sleeve, a flow bean mounted in said sleeve, the ends of said sleeve being internally threaded and the threads thereof being spiralled in opposite directions, conduits mounted on the outlet and inlet ends of said sleeve, means for rotating said sleeve and to cause the endwise movement of said conduits, the conduit mounted on the inlet side of said sleeve having a cage freely mounted therein, one end of said cage being recessed to receive one end of the flow bean and the other end of said cage having valve actuating means thereon, a yieldable flow valve in said conduit positioned to be opened and closed by said cage upon endwise movement of said conduit and a back pressure valve mounted in the conduit on the outlet end of said sleeve.

3. In a choke, a rotatable sleeve, said sleeve having internally cut oppositely spiralled threads at the respective ends thereof, an enlarged chamber in said sleeve, a flow bean mounted in said chamber, a conduit mounted on the inlet side of said sleeve having a valve seat and valve yieldably maintained on said seat, said conduit being movable endwise upon rotation of said sleeve, a slidable cage in said conduit having one end recessed to receive one end of said flow bean and having an outwardly extended finger mounted on the opposing end thereof, said cage moving against the flow bean and said finger disengaging the said valve from its seat when the sleeve is rotated in one direction moving out of contact with the valve and flow bean when the sleeve is moved in the other direction.

4. In a choke, a tubular sleeve, a flow bean, means for mounting said flow bean in said sleeve, oppositely spiralled threads in the respective ends of said sleeve, conduits mounted in said ends and cooperating with said means to releasably mount said flow bean in said sleeve, yieldable valves in said conduits, one of said conduits having means for actuating one of said valves as the sleeve is rotated to close said last mentioned valve and said conduits being so positioned in said valve closed position to release said flow bean.

References Cited in the file of this patent

UNITED STATES PATENTS

| | | |
|---|---|---|
| 346,438 | Gillette | July 27, 1886 |
| 923,199 | Pahlow | June 1, 1909 |
| 2,271,282 | Young | Jan. 27, 1942 |
| 2,334,166 | Allen | Nov. 16, 1943 |
| 2,524,052 | Grant | Oct. 3, 1950 |